April 25, 1967  O. Q. TAYLOR  3,315,934
SELF-LEVELING SEAT FOR TRACTORS
Filed May 5, 1965
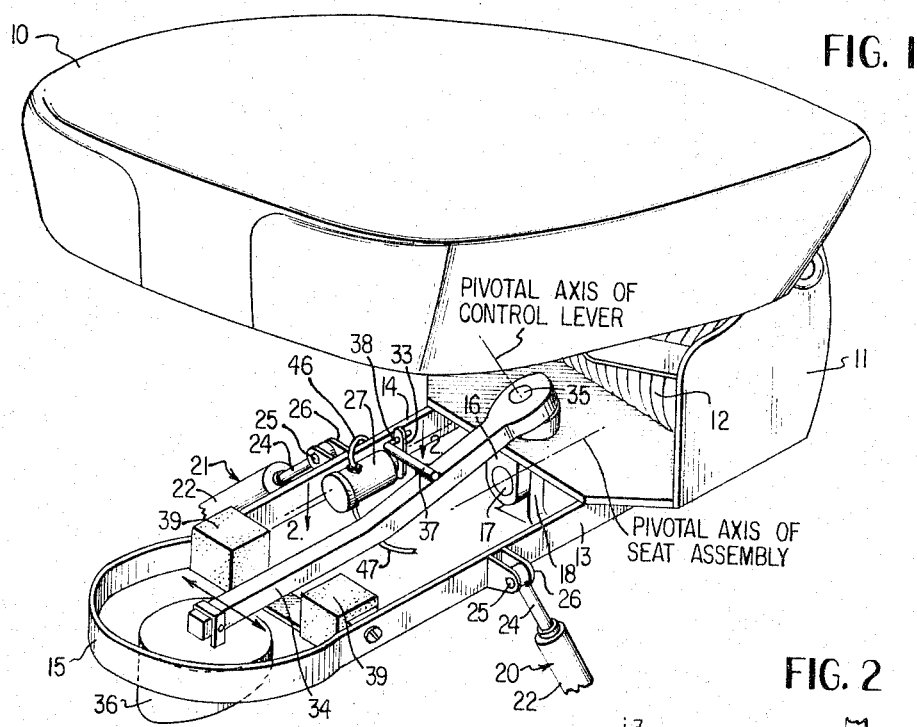
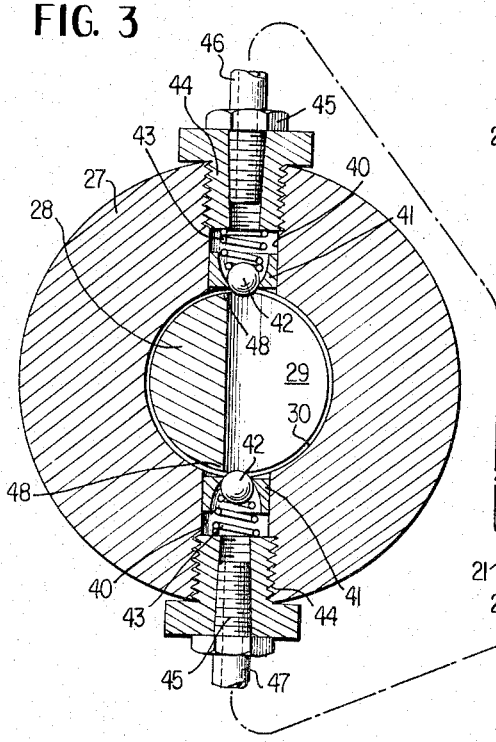
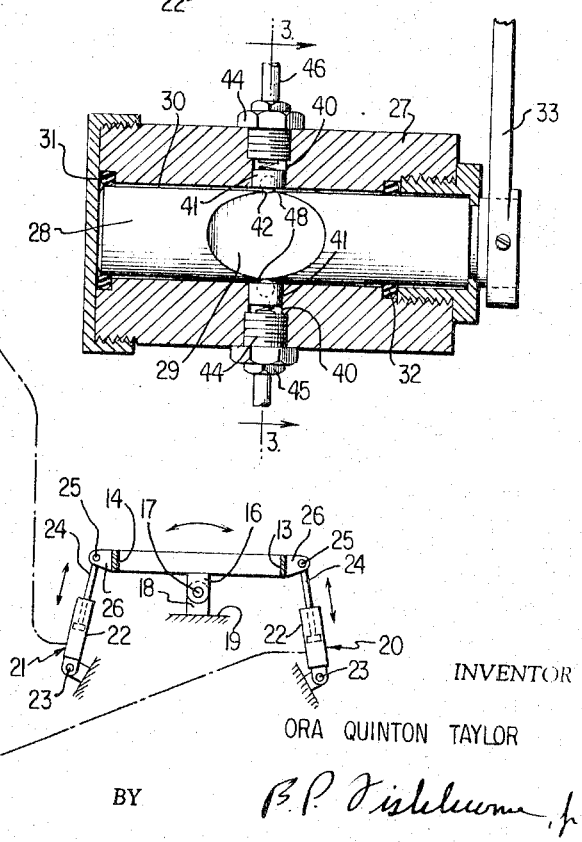
INVENTOR
ORA QUINTON TAYLOR
BY
ATTORNEY

United States Patent Office 3,315,934
Patented Apr. 25, 1967

3,315,934
SELF-LEVELING SEAT FOR TRACTORS
Ora Quinton Taylor, Rte. 3, Trenton, Tenn. 38382
Filed May 5, 1965, Ser. No. 453,382
8 Claims. (Cl. 248—376)

This invention relates to a self-leveling seat for tractors or the like.

Tractors with automatic or semi-automatic seat leveling means are known in the prior art. Examples of the art are United States Patents 2,572,910, issued Oct. 30, 1951 to Brown, and 2,966,937, issued Jan. 3, 1961 to Rydberg. These prior patents and others along broadly similar lines show mechanisms which are capable of leveling the tractor seat or allowing the seat to assume a level position when one wheel of the tractor is in a ditch or furrow. However, these prior art devices have not proved to be entirely practical because of being rather complicated and expensive to manufacture and install upon standard tractors. Frequently, it has been necessary to alter the basic seat construction on the tractor and to provide for the mounting of special motors and other mechanisms to operate the seat.

It is the prime object of the present invention to improve upon the prior art through the provision of a hydraulically controlled self-leveling tractor seat which is highly simplified in construction and operation and very economical to manufacture and to install on substantially any tractor and which is free of driving motors, complicated valves, switches and the like.

Another important object is to provide a self-leveling seat which requires virtually no modification of the basic seat structure or tractor structure and can be provided on the market in the form of a very simple attachment kit readily installable upon new or exisiting tractors.

Another object is to provide a self-leveling tractor seat which is operated by gravity when the tractor tilts laterally in either direction and which requires the application of no positive pressure to the closed self-contained hydraulic operating circuit except the pressure caused by the weight of the driver upon the seat.

Other objects and advantages of the invention will be apparent during the course of the following detailed description.

In the accompanying drawings forming a part of this application and in which like numerals are employed to designate like parts throughout the same.

FIGURE 1 is a perspective view of a self-leveling tractor seat embodying the invention;

FIGURE 2 is an enlarged central vertical section through a seat position control valve taken on line 2—2 of FIGURE 1; and FIGURE 3 is a further enlarged partly diagrammatic vertical section taken on line 3—3 of FIGURE 2.

In the drawings, wherein for the purpose of illustration is shown a preferred embodiment of the invention, the numeral 10 designates a tractor seat having a main mounting bracket 11 including the usual shock-absorbing means 12 of conventional construction. As shown in FIGURE 1, the mounting bracket 11 has rigidly secured to it a pair of spaced parallel rearwardly extending arms 13 and 14 having their rear ends interconnected by a curved loop or guard 15 integral therewith. The entire assembly thus far described including mounting bracket 11 and all parts carried thereby is pivoted for transverse rocking movement upon an axis which extends longitudinally of the tractor. More particularly, the bracket 11 carries a depending lug 16 which is pivoted by a pin element 17 to an upstanding rigid lug 18 or support on the top of the tractor transmission housing 19, FIGURE 3. The entire seat assembly is therefore rockable to the left or right on the axis of the pin 17, as when the tractor is tilted to the left or right and the seat leveling means to be described performs its automatic leveling operation.

The means for leveling the seat assembly includes a pair of generally upright fluid-filled extensible cylinder-piston units 20 and 21 including cylinder bodies 22 whose lower ends are pivotally connected at 23 to the sloping sides of the tractor transmission housing. The extensible and retractable units 20 and 21 further include pistons having piston rods 24 projecting from the upper ends of the piston bodies and having their top ends pivotally connected at 25 to pairs of lugs 26 on opposite sides of the seat assembly and secured rigidly to the arms 13 and 14. The cylinder-piston units 20 and 21 through their connections with the tiltable seat structure thus constitute a fluid displacement device or means for the closed fluid-filled loop or circuit depicted in FIGURE 3, and through the operation of this fluid displacement device or means, fluid may be caused to flow selectively in either direction in the closed loop.

A control or check valve casing 27 is suitably bracketed to the arm 14, FIGURE 1, and contains a cylindrical rotary valve element or plug 28 provided near the center of the valve casing with a relatively large recess 29 forming a passage for fluid transversely of the plug and transversely of the cylindrical bore 30 of the casing 27. The rotary plug 28 is sealed within the casing 27 by conventional sealing devices 31 and 32 near opposite ends thereof and on opposite sides of the recess 29.

One end of the rotary plug 28 extends exteriorly of the casing 27 and has rigidly secured thereto an operating arm or crank 33. A pendulum weight controlled lever 34 extends generally horizontally between the arms 13 and 14 and near one side of the valve casing 27 and has its forward end pivoted to the mounting bracket 11 by a pivot pin 35 whose axis is inclined as depicted in FIGURE 1. The rear end portion of the lever 34 is considerably lower than the forward pivoted end thereof and such rear end carries a pendulum weight 36 within the confines of the guard 15, this weight being responsive to lateral tilting of the tractor to cause the lever 34 to swing in either direction laterally upon the axis of the pin 35.

The weight operated lever 34 has rigidly secured thereto intermediate its ends a lateral pin 37 having a right angular extension 38 pivotally connected to the top of control valve crank 33 to turn the same in response to swinging of the lever 34 in either direction. The movement of the lever 34 in both directions is limited by cushioning blocks 39 suitably secured to the inner sides of arms 13 and 14, as shown.

Valve casing 27 is provided at diametrically opposite sides thereof and adjacent the recess 29 with radial openings 40 containing stationary seats 41 for opposed ball check valve elements 42 which are inwardly seating as shown in FIGURE 3. The ball valve elements are normally held seated by compression springs 43, held in place by screw-threaded nipples 44 receiving screw-threaded tubular fittings 45 therein. The fittings 45 are connected with flexible hydraulic hoses 46 and 47 whose corresponding ends are connected with the cylinders 22 near their lower ends and below the pistons as shown diagrammatically in FIGURE 3, thereby forming a closed fluid-filled hydraulic system or loop which requires no pressurizing other than the pressure caused by the weight on the seat 10. The hydraulic fluid enters and leaves each cylinder body 22 through their connections with the hoses 46 and 47 and by no other paths. In effect, the control valve casing 27 is connected in a fluid line between and in series with the two cylinder-piston units 20 and 21. If desired, as a slight modification, not shown, a retarding type valve can be connected in the flexible line between the two cylinder piston units to slow down the fluid flow action or completely stop the same, if desired. This is an optional feature omitted from the present drawings for the sake of simplicity and because the present drawings illustrate the preferred form of the invention.

Another optional variation of the mechanism, not shown, is that the weight-operated lever 34 may in some cases be mounted substantially vertically, rather than substantially horizontally without otherwise altering the mechanism.

The operation of the self-leveling seat structure is briefly as follows:

While the tractor is on level ground, the pendulum weight 36 and weight lever 34 are in the neutral position shown in FIGURE 1 and the valve plug 28 is also in the neutral position of FIGURES 2 and 3 and no fluid can pass through the check valve from one cylinder-piston unit to the other and therefore the seat is hydraulically locked in the level position, both ball check valves 42 being seated or closed and being biased to the closed position.

When the tractor is tilted either to the left or to the right, the pendulum weight 36 and lever 34 will swing upon the pivot pin 35 in one direction as indicated by the arrows in FIGURE 1. When this occurs, the crank 33 will turn the valve plug 28 a slight amount within the casing 27 and one of the two cam edges 48 produced by the formation of the recess 29 will immediately unseat the adjacent ball valve element 42 while allowing the opposite ball valve element to remain closed. The particular valve element 42 which will be opened by the rotation of the plug 28 is the one which is connected by the associated hydraulic line and cylinder-piston unit to the high side of the tractor seat caused by the tilting of the tractor. Therefore, when this high side ball valve is opened, the weight of the driver on the seat causes the seat to seek a level position and this pressure acts on the cylinder-piston unit 20 or 21 connected with the high side and pressurizes the fluid in the flexible line on the high side and such fluid may then flow around the ball valve element 42 which is unseated and flow into the recess 29. The increase in pressure in the recess 29 is sufficient to unseat the other ball valve element 42 and the fluid continues to flow to and through the other flexible line and into the other cylinder-piston unit until the seat reaches a level condition.

The hydraulic fluid can flow only in one direction at a time. When one of the valve elements 42 is unseated by the turning of the plug 28, the other ball valve element 42 serves automatically to check or block reverse flow of fluid. Essentially, when the tractor tilts and the seat tilts, the weight of the operator on the seat serves to pressurize the system and to cause the fluid to flow in one direction. Gravity acting on the weight 36 causes rotation of the control valve plug 28 in the direction to unseat the ball valve which is connected with the high side of the seat, as stated. The fluid simply flows at this time from the cylinder-piston unit on the high side, through the control valve and into the other cylinder-piston unit on the low side of the seat. As this action takes place, the seat automatically shifts or pivots from the tilted position to a level position. The arrangement is such that the seat is continuously automatically self-leveling and self-locking when the valve is in the neutral position illustrated in FIGURE 3. No motors, pumps, or electrical switches are required and the system operates by gravity and by the weight of the operator on the seat. It is thought that the advantages of the extremely simple mechanism will be readily appreciated by those skilled in the art without any further description. The closed fluid-filled loop depicted in FIGURE 3 requires no exhaust or fluid intake and is not dependent in any way on an outside pressurizing source, such as the fluid pressure system of a tractor. Pressurizing of the system is derived solely from the weight borne by the seat 10.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A self-leveling seat for tractors and the like comprising a closed fluid-filled loop, a fluid displacement device connected in said closed loop and operable to displace the fluid therein selectively in either direction, a check valve means connected in said closed loop in series with the fluid displacement device and serving normally to prevent displacement of the fluid in said loop when the seat is substantially level, a two-way tiltable seat structure having a connection with the fluid displacement device, whereby the weight upon the seat structure is the sole operating force for the fluid displacement device and the sole means of pressurizing the fluid within said loop responsive to tilting of the seat in either direction, and a tilt-responsive actuator for the check valve means operable upon tilting of the seat structure in either direction to open the check valve means and allow the fluid in said closed loop to be displaced by said displacement device in a direction to level the seat, thereby returning the seat structure to a substantially level position, the check valve means simultaneously preventing displacement of the fluid in the opposite direction in said closed loop.

2. The invention as defined by claim 1, and wherein said tilt-responsive actuator is a pendulum weight actuator pivoted to the seat structure and operatively connected with said check valve means.

3. The invention as defined by claim 2, and wherein the check valve means includes a pair of opposing normally closed check valve elements, and a movable member adapted to unseat either element selectively without disturbing the other element and connected with and operated by the pendulum weight actuator.

4. The invention as defined by claim 3, and wherein said check valve elements are a pair of spring-biased ball elements and said movable member is a rotary plug having cam parts to engage and unseat the ball elements selectively.

5. The invention as defined by claim 1, and wherein said fluid displacement device comprises a pair of cylinder-piston units connected in series in said fluid-filled loop, said two-way tiltable seat structure having a connection with each of said units so that they may be operated by the seat structure simultaneously in response to weight upon the high side of the seat structure.

6. A self-leveling seat for tractors and the like comprising a closed fluid-filled loop, a fluid displacement cylinder-piston means connected in said closed loop and operable to displace the fluid therein selectively in either direction, a pivoted and tiltable seat structure having a connection with said cylinder-piston means and operating the same directly in response to tilting of the seat structure in either direction, the weight borne by the high side of the seat structure tending to resist the tilting and being the sole actuating force for the cylinder-piston means, a two-way check valve means connected in said closed loop in series with the cylinder-piston means and serving normally to prevent displacement in any direction of the fluid in the closed loop while the seat structure is substantially level, and a pendulum actuator for the two-way check valve means responding to tilting of the seat structure and then opening the check valve means in one direction only and allowing the cylinder-piston means in response to weight on the high side of the seat structure to displace fluid in the closed loop only in the direction causing the seat structure to return to a substantially level position.

7. The invention as defined by claim 6, and wherein the seat structure comprises a seat body portion, bracket means secured to and carrying the seat body portion, and a pivot element upon which the bracket means is mounted for tilting in opposite directions, the pivot element being mountable upon a tractor or the like.

8. The invention as defined by claim 7, and wherein said pendulum actuator is carried by the bracket means.

References Cited by the Examiner

UNITED STATES PATENTS

| | | | |
|---|---|---|---|
| 2,284,352 | 5/1942 | Zank | 248—376 |
| 2,908,472 | 10/1959 | McDonald | 280—6 X |
| 2,920,636 | 1/1960 | Gassner | 280—6 X |
| 3,021,107 | 2/1962 | Salo | 248—376 |
| 3,133,744 | 5/1964 | Weiertz | 280—6 X |
| 3,218,019 | 11/1965 | Elfes et al. | 248—399 |
| 3,232,635 | 2/1966 | Drechsel | 280—6.1 X |

CLAUDE A. LE ROY, *Primary Examiner.*

R. P. SEITTER, *Assistant Examiner.*